United States Patent
Shroff et al.

(10) Patent No.: US 11,041,807 B2
(45) Date of Patent: Jun. 22, 2021

(54) SYSTEMS AND METHODS FOR MULTI-VIEW NONLINEAR OPTICAL IMAGING FOR IMPROVED SIGNAL-TO-NOISE RATIO AND RESOLUTION IN POINT SCANNING MULTI-PHOTON MICROSCOPY

(71) Applicant: The United States of America, as Represented by the Secretary, Depart. of Health and Human Services, Bethesda, MD (US)

(72) Inventors: Hari Shroff, Rockville, MD (US); Yicong Wu, Rockville, MD (US)

(73) Assignee: The United States of America, as represented by the Secretary, Department of Health and Human Services, Bethesda, MD (US)

(*) Notice: Subject to any disclaimer, the term of this patent is extended or adjusted under 35 U.S.C. 154(b) by 504 days.

(21) Appl. No.: 15/754,948

(22) PCT Filed: Aug. 22, 2016

(86) PCT No.: PCT/US2016/048058
§ 371 (c)(1),
(2) Date: Feb. 23, 2018

(87) PCT Pub. No.: WO2017/035078
PCT Pub. Date: Mar. 2, 2017

(65) Prior Publication Data
US 2020/0200681 A1 Jun. 25, 2020

Related U.S. Application Data
(60) Provisional application No. 62/210,153, filed on Aug. 26, 2015.

(51) Int. Cl.
*G01N 21/64* (2006.01)
*G02B 21/00* (2006.01)
(Continued)

(52) U.S. Cl.
CPC ....... *G01N 21/6458* (2013.01); *G02B 21/002* (2013.01); *G02B 21/16* (2013.01); *G02B 21/367* (2013.01)

(58) Field of Classification Search
CPC .. G01N 21/6458; G02B 21/002; G02B 21/16; G02B 21/367
See application file for complete search history.

(56) References Cited

U.S. PATENT DOCUMENTS 5,671,085 A * 9/1997 Gustafsson ............ G02B 21/22
359/368
2011/0115895 A1 * 5/2011 Huisken ............... G02B 21/008
348/79

(Continued)

FOREIGN PATENT DOCUMENTS

DE 10 2006 028530 A1 5/2007
WO 2015/075246 A1 5/2015

OTHER PUBLICATIONS

Extended European Search Report issued in corresponding European Application No. 16839943.4 dated Mar. 22, 2019, 10 pages.

(Continued)

*Primary Examiner* — Collin X Beatty

(57) ABSTRACT

Various embodiments of a multi-photon microscopy system that uses sequential excitation of a sample through three or more objective lenses oriented at different axes intersecting the sample are disclosed. Each objective lens is capable of focused sequential excitation of the sample that elicits fluorescence emissions from the excited sample, which is then simultaneously detected by each respective objective (Continued)

lens along a respective longitudinal axis every time the sample is illuminated through only a single objective lens.

17 Claims, 4 Drawing Sheets

(51) Int. Cl.
*G02B 21/16* (2006.01)
*G02B 21/36* (2006.01)

(56) References Cited

U.S. PATENT DOCUMENTS

| | | | | |
|---|---|---|---|---|
| 2011/0122488 | A1* | 5/2011 | Truong | G01N 21/6408 359/385 |
| 2012/0049087 | A1* | 3/2012 | Choi | G02B 21/367 250/459.1 |
| 2013/0229493 | A1* | 9/2013 | Ikuta | G02B 21/0076 348/46 |
| 2014/0099659 | A1* | 4/2014 | Keller | G02B 21/06 435/29 |
| 2014/0126046 | A1* | 5/2014 | Shroff | G02B 21/0004 359/385 |
| 2015/0198794 | A1* | 7/2015 | Rondeau | G02B 21/10 359/390 |
| 2016/0004058 | A1* | 1/2016 | Wayne | G02B 21/0032 356/520 |
| 2016/0054553 | A1* | 2/2016 | Pantazis | G02B 27/141 250/459.1 |
| 2016/0187633 | A1* | 6/2016 | Rondeau | G02B 21/367 359/385 |
| 2016/0320301 | A1* | 11/2016 | Knebel | G01N 21/4795 |
| 2017/0351082 | A1* | 12/2017 | Ripoll Lorenzo | G06T 15/08 |
| 2017/0371140 | A1* | 12/2017 | Cooper | G02B 21/367 |

OTHER PUBLICATIONS

Lindek, S, et al., "Confocal Theta Microscope with Three Objective Lenses", Review of Scientific Instruments, AIP, Melville, NY, US, vol. 65, No. 11, Nov. 1, 1994, pp. 3367-3372.

Swoger, et al., "Multiple Imaging Axis Microscopy Improves Resolution for Thick-Sample Applications", Optics Letters, vol. 28, No. 18, Sep. 15, 2003, p. 1654.

* cited by examiner

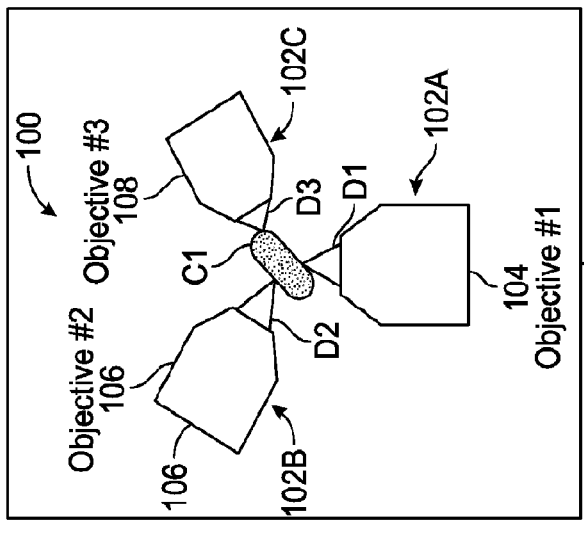
FIG. 2A
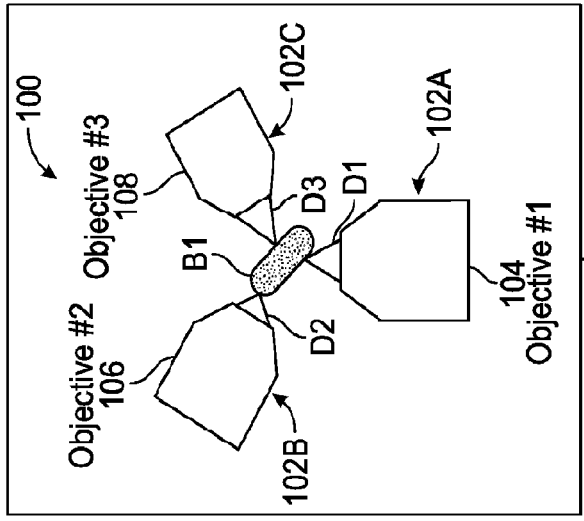
FIG. 2B
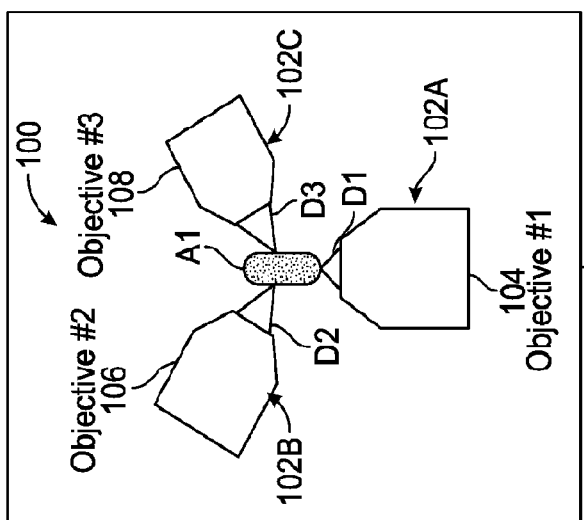
FIG. 2C
FIG. 2D

SYSTEMS AND METHODS FOR MULTI-VIEW NONLINEAR OPTICAL IMAGING FOR IMPROVED SIGNAL-TO-NOISE RATIO AND RESOLUTION IN POINT SCANNING MULTI-PHOTON MICROSCOPY

FIELD

The present disclosure generally relates to nonlinear optical imaging, and in particular, to multi-view nonlinear optical imaging for multi-photon microscopy systems.

BACKGROUND

Nonlinear optical imaging remains the premier technique for deep-tissue imaging in which typically a multi photon arrangement may be used to illuminate and excite a sample. The advantages of nonlinear optical imaging relative to conventional, single-photon imaging are: (1) the reduction in excitation-side scattering due to the near infra-red excitation wavelengths; 2) optical sectioning due to the power law dependence of fluorescence emission on excitation intensity; and (3) the reduction in emission-side scattering whenever excitation light is likely to result in fluorescence. However, the penetration depth and signal-to-noise ratio of this technique is ultimately limited by scattering. In particular, excitation scattering destroys the ability to form a sharp focus at depth, which eventually results in a loss in fluorescence signal, while scattering of the fluorescence at depth eventually results in so much lost signal that useful imaging is impossible. In addition scattering on both the excitation and emission sides also degrades spatial resolution such that images acquired deep into a sample fail to achieve diffraction-limited resolution. As such, there is a need for improvements in nonlinear optical imaging that mitigates the effects of scattering.

BRIEF DESCRIPTION OF THE DRAWINGS

FIGS. 2A-2D are simplified illustrations showing the various steps for multi-view nonlinear optical imaging according to one aspect of the multi-photon microscopy system;

Corresponding reference characters indicate corresponding elements among the view of the drawings. The headings used in the figures do not limit the scope of the claims.

DETAILED DESCRIPTION

Figure 1:
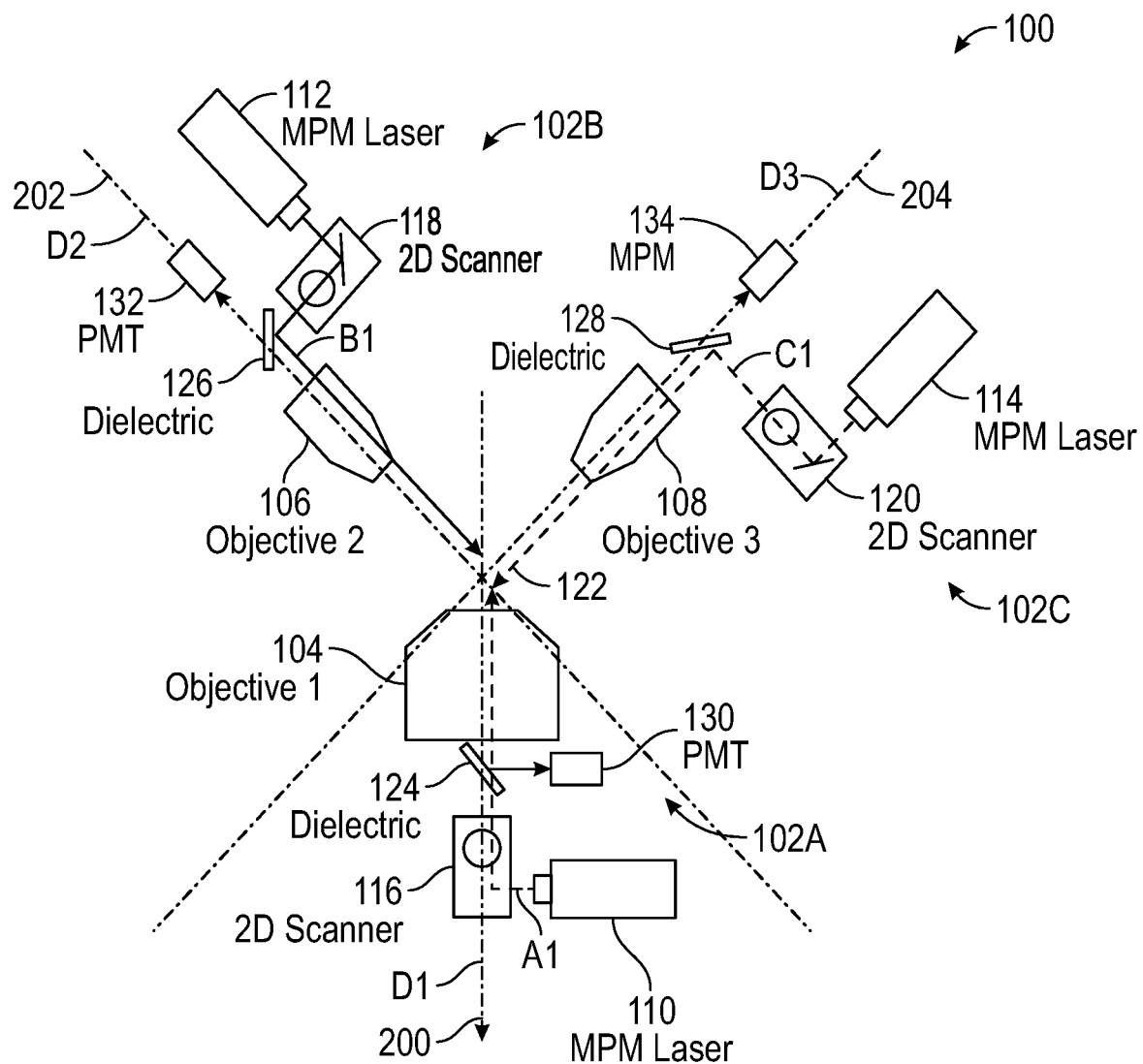
FIG. 1 is a simplified illustration showing one embodiment of a multi-photon microscopy system utilizing multi-view nonlinear optical imaging.

Various embodiments of a multi-photon microscopy system that uses sequential excitation of a sample through three or more objective lenses oriented at different axes intersecting the sample are disclosed. Each objective lens is capable of focused sequential excitation of the sample that elicits fluorescence emissions from the excited sample, which is then simultaneously detected by each respective objective lens along a respective longitudinal axis every time the sample is illuminated through only a single objective lens.

Referring to the drawings, an embodiment of a multi-photon microscopy system utilizing a multi-view nonlinear optical imaging is illustrated and generally indicated as 100 in FIGS. 1-4.

Referring to FIG. 1, one embodiment of the multi-photon microscopy system 100 may include a first objective lens 104, a second objective lens 106 and a third objective lens 108 which are oriented along respective first, second and third longitudinal axes 200, 202 and 204 that intersect different portions of a sample 122 to be illuminated. Although the above embodiments include first, second and third objective lenses 104, 106 and 108, other embodiments of the multi-photon microscopy system 100 may include four or more objective lenses that are oriented at different longitudinal axes, which intersect the sample 122. In some embodiments, the first, second and third objective lenses 104, 106 and 108 may be arranged around the sample 122 such that each objective lens 104, 106 and 108 are equidistant from each other. In other embodiments, the first, second and third objective lenses 104, 106 and 108 may be arranged around the sample 122 such that each of the first, second and third objective lenses 104, 106, and 108 is the same distance from the sample 122. In other embodiments, the first, second and third objective lenses 104, 106 and 108 may be positioned such that the point in the sample 122 being imaged is within the working distance of at least one of the first, second and third objective lenses 104, 106 and 108.

As illustrated in FIGS. 2A-2D, in some embodiments the multi-photon microscopy system 100 operates such that each of the first, second and third objective lenses 104, 106 and 108 sequentially illuminate the sample 122 from a respective longitudinal axis 200, 202, and 204. Once the sample 122 has been illuminated by one of the three objective lenses 104, 106 and 108, the first, second and third objective lenses 104, 106 and 108 then simultaneously detect the different fluorescence emissions D1, D2 and D3 emitted by the illuminated sample 122 along respective longitudinal axis 200, 202, and 204. For example, FIGS. 2A-2C, illustrate different illumination and detection sequences in which the sample 122 is sequentially illuminated through either the first, second and third objective lenses 104, 106 and 108 and then simultaneous detection of fluorescence emissions D1, D2 and D3 emitted from the sample 122 through the first, second and third objective lenses 104, 106 and 108 after each sequential illumination of the sample 122.

FIG. 2A shows a first sequence of illumination and detection in which the first objective lens 104 of a first optical arrangement 102A illuminates the sample 122 with laser beam A1 along the first longitudinal axis 200. Once the sample 122 is illuminated through the first objective lens 104 by laser beam A1, the fluorescence emissions D1, D2 and D3 generated by the excited sample 122 are simultaneously detected by the first, second and third objective lenses 104, 106 and 108 along the first, second and third longitudinal axes 200, 202 and 204, respectively.

FIG. 2B shows a second sequence of illumination and detection in which the second objective lens 106 of a second optical arrangement 102B illuminates the sample 122 with laser beam B1 along the second longitudinal axis 202. Once the sample 122 is illuminated through the second objective lens 106 by laser beam B1, the fluorescence emissions D1, D2 and D3 generated by the excited sample 122 are simultaneously detected by the first, second and third objective lenses 104, 106 and 108 along first and second and third longitudinal axes 200, 202 and 204, respectively.

FIG. 2C shows a third sequence of illumination and detection in which the third objective lens 108 of a third optical arrangement 102C illuminates the sample 122 with laser beam C1 along the third longitudinal axis 204. Once the sample 122 is illuminated through the third objective lens 108 by laser beam C1, the fluorescence emissions D1, D2 and D3 generated by the excited sample 122 are simultaneously detected by the first, second and third objective lenses 104, 106 and 108 along first and second and third longitudinal axes 200, 202 and 204, respectively.

FIGS. 2A, 2B and 2C illustrate three different sequences of illumination and detection conducted by the multi-photon microscopy system 100 in which the sample 122 is illuminated by only one of the three objective lenses 104, 106 and 108 followed by simultaneous detection by all three objective lenses 104, 106 and 108.

Figure 3:
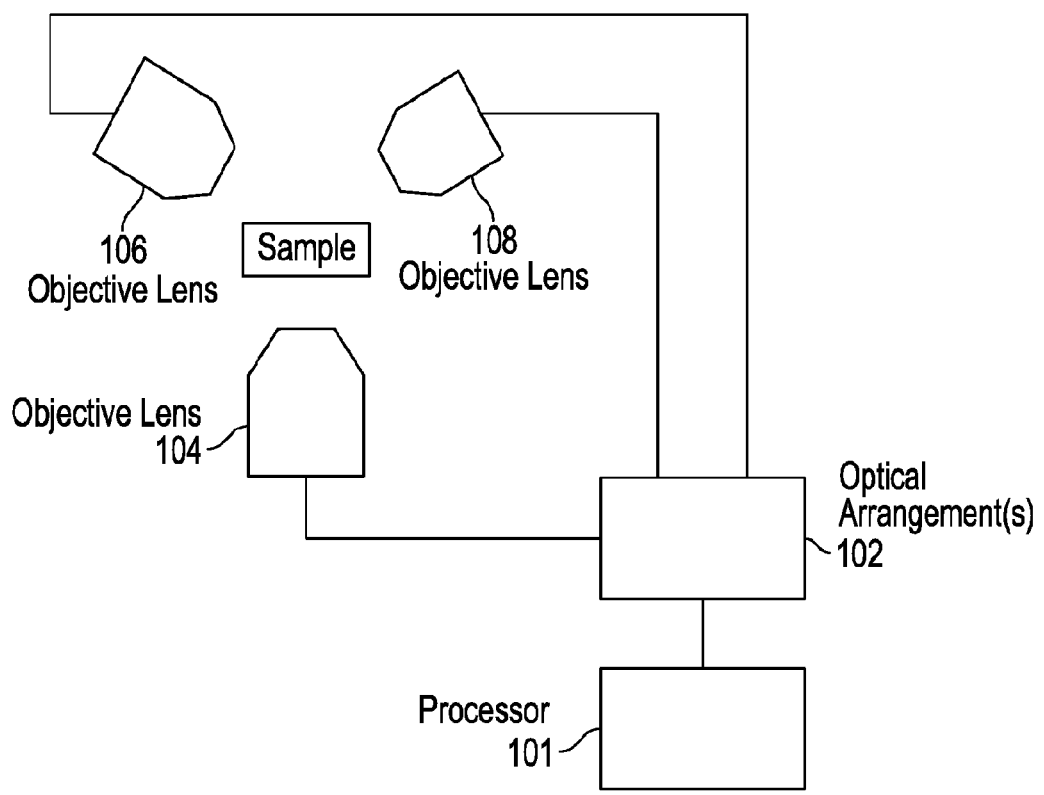
FIG. 3 is a simplified illustration showing one embodiment of the multi-photon microscopy system.

Referring to FIGS. 3 and 2D, the fluorescence emissions D1, D2 and D3 detected through the first, second and third objective lenses 104, 106, and 108 are processed for each sequence of illumination and detection by a processor 101 to generate image data representing different views of the sample 122 that correspond to respective one of the first, second or third longitudinal axes 200, 202, and 204 of the first, second and third objective lenses 104, 106, and 108.

In some embodiments, a first set of image data may be compiled by the processor 101 from the first sequence of illumination and detection based on fluorescence emissions D1 detected through the first objective lens 104 along first longitudinal axis 200, fluorescence emissions D2 detected through the second objective lens 106 along second longitudinal axis 202, and fluorescence emissions D3 detected through the third objective lens 108 along third longitudinal axis 204 when the sample 122 is illuminated only through the first objective lens 104 oriented along the first longitudinal axis 200 as shown in FIG. 2A.

In some embodiments, a second set of image data may be compiled by the processor 101 from the second sequence of illumination and detection based on fluorescence emissions D1 detected through the first objective lens 104 along longitudinal axis 200, fluorescence emissions D2 detected through the second objective lens 106 along longitudinal axis 202, and fluorescence emissions D3 detected through the third objective lens 108 along longitudinal axis 204 when the sample 122 is illuminated only through the second objective lens 106 oriented along the second longitudinal axis 202 as shown in FIG. 2B.

In some embodiments, a third set of image data may be compiled by the processor 101 from the third sequence of illumination and detection based on fluorescence emissions D1 detected through the first objective lens 104 along longitudinal axis 200, fluorescence emissions D2 detected through the second objective lens 106 along second longitudinal axis 202, and fluorescence emissions D3 detected through the third objective lens 108 along third longitudinal axis 204 when the sample 122 is illuminated only through the third objective lens 108 along the third longitudinal axis 204 as shown in FIG. 2C.

In some embodiments, the multi-photon microscopy system 100 may employ a multi-view nonlinear optical imaging method using a joint deconvolution and/or registration to process the image data received through the first, second and third objective lenses 104, 106 and 108. For example, a Richardson-Lucy deconvolution may be applied to the image data by the processor 101 to produce a final composite image that reduces blur. In the registration process, all of the images taken of the sample 122 are aligned in space by the processor 101 (FIG. 3).

In some embodiments, the first set of image data described above may include three separate images generated from the illumination of the sample 122 through the first objective lens 104 which results in a first image derived from fluorescence emissions D1, a second image derived from fluorescence emissions D2, and a third image derived from fluorescence emissions D3. Similarly, the second set of image data may also include three separate images generated from the illumination of the sample 122 through the second objective lens 106 which results in a first image derived from fluorescence emissions D1, a second image derived from fluorescence emissions D2, and a third image derived from fluorescence emissions D3. Similarly, the third set of image data may also include three separate images generated from the illumination of the sample 122 through the third objective lens 108 which results in a first image derived from fluorescence emissions D1, a second image derived from fluorescence emissions D2, and a third image derived from fluorescence emissions D3. In some embodiments as shown in FIG. 2D, the processor 101 in a first step may combine together any one or more of the first, second and third images for a particular set of image data to generate processed sets of image data. The processor 101 may then register the processed sets of image data derived from fluorescence emissions D1, D2 and D3 for each objective lens 104, 106 and 108. Once the processed sets of image data have been registered, the data may be combined to improve the signal-to-noise ratio, but not the resolution of the image itself. In the alternative, once the processed sets of image data have been registered, the data may be combined and a joint deconvolution applied to the data which improves resolution and the signal-to-noise ratio of the data.

Referring back to FIG. 1, in some embodiments the multi-photon microscopy system 100 includes first, second, and third optical arrangements 102A, 102B and 102C which sequentially illuminate the sample 122 through the first, second and third objective lenses 104, 106 and 108, respectively, and then simultaneously detect the fluorescence emissions D1, D2 and D3 emitted by the sample 122 through the first, second and third objective lenses 104, 106 and 108.

In some embodiments, the first optical arrangement 102A includes the first objective lens 104 that focuses the laser beam A1 to excite the sample 122 and then the first, second and third objective lenses 104, 106 and 108 of the first, second and third optical arrangements 102A, 102B and 102C, respectively, simultaneously detect the fluorescence emissions D1, D2 and D3 from the sample 122 after excitation. In one arrangement, the first objective lens 104 may be oriented along a first longitudinal axis 200 that intersects the sample 122 and is in the focal plane of the first objective lens 104. In some embodiments, the first objective lens 104 is in operative association with a laser source 110, such as an MPM laser, that generates laser beam A1, which is scanned by a two-dimensional scanner 116 onto the sample 122 using a dichroic mirror 124 and the first objective lens 104. As noted above, the laser beam A1 sequentially illuminates the sample 122 to generate fluorescence emissions D1, D2 and D3 during excitation in which fluorescence emissions D1 is detected through the first objective lens 104. The first objective lens 104 focuses the fluorescence emissions D1 onto the dichroic mirror 124, which then redirects the fluorescence emissions D1 for detection by a point detector 130. In some embodiments, the point detector 130 may be a photomultiplier tube. Once the fluorescence emissions D1 is detected by the first optical arrangement 102A, the data derived from the detected fluorescence emissions D1 is forwarded to the processor 101 for processing.

In some embodiments the second optical arrangement 102B may have the same components as the first optical arrangement 102A. As further in FIG. 1, the second optical arrangement 102B includes the second objective lens 106 that focuses the laser beam B1 to excite a sample 122 and then the first, second and third objective lenses 104, 106 and 108 of the first, second and third optical arrangements 102A, 102B and 102C, respectively, simultaneously detect the fluorescence emissions D1, D2, and D3 from the sample 122 after excitation. In one arrangement, the second objective lens 106 may be oriented along the second longitudinal axis 202 that intersects the sample 122 and is in the focal plane of the second objective lens 106. In some embodiments, the second objective lens 106 is in operative association with a laser source 112, such as an MPM laser, that generates laser beam B1, which is scanned by a two-dimensional scanner 118 onto the sample 122 using a dichroic mirror 126 and the second objective lens 106. As noted above, the laser beam B1 sequentially illuminates the sample 122 to generate fluorescence emissions D1, D2 and D3 during excitation in which fluorescence emissions D2 are detected through the second objective lens 106. The second objective lens 106 focuses the fluorescence emissions D2 onto the dichroic mirror 126, which then redirects the fluorescence emissions D2 for detection by a point detector 132. In some embodiments, the point detector 132 may be a photomultiplier tube. Once the fluorescence emissions D2 are detected by the second optical arrangement 102B, the data derived from the detected fluorescence emissions D2 is forwarded to the processor 101 for processing.

In some embodiments, the third optical arrangement 102C may have the same components as the first and second optical arrangements 102A and 102B. As shown in FIG. 1, the third optical arrangement 102C includes the third objective lens 108 that focuses the laser beam C1 to excite the sample 122 and then the first, second, and third objective lenses 104, 106 and 108 of the first, second and third optical arrangements 102A, 102B and 102C, respectively simultaneously detect the fluorescence emissions D1, D2 and D3 from the sample 122 after excitation. In one arrangement, the third objective lens 108 may be oriented along the third longitudinal axis 204 that intersects the sample 122 and is in the focal plane of the third objective lens 108. In some embodiments, the third objective lens 108 is in operative association with a laser source 114, such as an MPM laser, that generates laser beam C1, which is scanned by a two-dimensional scanner 120 onto the sample 122 using a dichroic mirror 128 and the third objective lens 108. As noted above, the laser beam C1 sequentially illuminates the sample 122 to generate fluorescence emissions D1, D2 and D3 in which fluorescence emissions D3 are detected through the third objective lens 108. The third objective lens 108 focuses the fluorescence emissions D3 emitted substantially along the first longitudinal axis 204 onto the dichroic mirror 128, which then redirects the fluorescence emissions D3 for detection by a point detector 134. In some embodiments, the point detector 134 may be a photomultiplier tube. Once the fluorescence emissions D3 are detected by the third optical arrangement 102C, the data derived from the detected fluorescence emissions D3 is forwarded to the processor 101 for processing.

In some embodiments, the multi-photon microscopy system 100 may have different optical arrangements to accomplish the multi-view nonlinear optical imaging as described above. In some embodiments, the multi-photon microscopy system 100 may include a single laser source and two-dimensional scanner arrangement that forms a part of an optical arrangement 102 that generates and transmits a laser beam sequentially through each of the first, second and third objective lenses 104, 106 and 108 as shown in FIG. 3. In this arrangement, the first objective lens 104 is directly associated with dichroic mirror 124 and point detector 130, the second objective lens 106 is directly associated with dichroic mirror 126 and point detector 132, and the third objective lens 108 is directly associated with dichroic mirror 128 and point detector 134. In other embodiments, the first optical arrangement 102A may have a laser source 110 and two-dimensional scanner 116 associated only with the first and third objective lenses 104 and 108, while the second optical arrangement 102B may have a laser source 112 and two-dimensional scanner 118 associated only with the second objective lens 106. In other embodiments, one or more optical arrangements may be associated with one or more objective lenses for providing a laser source and scanner arrangement that is shared by one or more of the objective lenses. In some embodiments, the two-dimensional scanners 116, 118 and 120 may be galvanometric mirrors, polygonal mirror scanners, and/or microelectronic mechanical systems (MEMS) mirrors.

Figure 4:
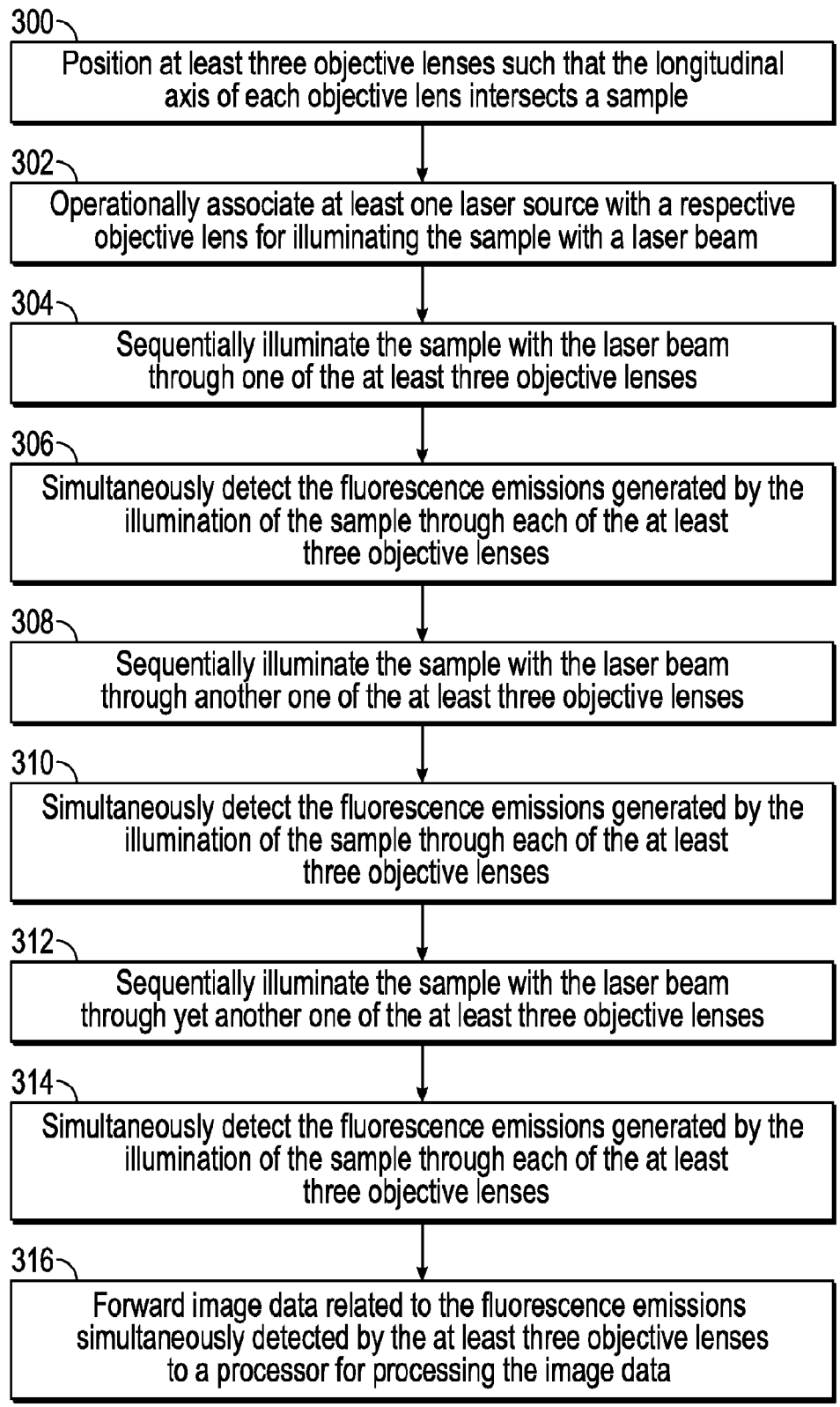
FIG. 4 is a flow chart illustrating one method for multi-view nonlinear imaging using one embodiment of the multi-photon microscopy system.

Referring to FIG. 4, a flow chart illustrates one method for using the multi-photon microscopy system 100 in multi-view nonlinear optical imaging. At block 300, position at least three objective lenses 104, 106 and 108 such that the longitudinal axis 200, 202 and 204 for each objective lens 104, 106 and 108 intersects a sample 122. At block 302, operationally associate at least one laser source 110, 112, and 114 with a respective objective lens 104, 106 and 108 for illuminating the sample 122 with a laser beam A1, B1 or C1. At block 304, sequentially illuminate the sample 122 with laser beam A1 through one of the at least three objective lenses 104, 106 or 108. At block 306, simultaneously detect the fluorescence emissions D1, D2 and D3 generated by the illumination of the sample 122 through each of the at least three objective lenses 104, 106 and 108. At block 308, sequentially illuminate the sample 122 with laser beam B1 through another one of the at least three objective lenses 104, 106, or 108. At block 310, simultaneously detect the fluorescence emissions D1, D2 and D3 generated by the illumination of the sample 122 through each of the at least three objective lenses 104, 106 and 108. At block 312, sequentially illuminate the sample 122 with laser beam C1 through yet another one of the at least three objective lenses 104, 106 or 108. At block 314, simultaneously detect the fluorescence emissions D1, D2 and D3 generated by the illumination of the sample 122 through each of the at least three objective lenses 104, 106 and 108. At block 316, forward image data related to the fluorescence emissions D1, D2 and D3 simultaneously detected by the at least three objective lenses to a processor 101 for processing the image data.

It should be understood from the foregoing that, while particular embodiments have been illustrated and described, various modifications can be made thereto without departing from the spirit and scope of the invention as will be apparent to those skilled in the art. Such changes and modifications are within the scope and teachings of this invention as defined in the claims appended hereto.

What is claimed is:

1. A multi-photon microscopy system comprising:
 a first objective lens oriented along a first longitudinal axis that intersects a sample at a first angle;

a second objective lens oriented along a second longitudinal axis that intersects the sample at a second angle;

a third objective lens oriented along a third longitudinal axis that intersects the sample at a third angle; and at least one laser source for generating a laser beam and a scanner for sequentially transmitting the laser beam through the first objective lens at a first illumination point focused in the sample, the second objective lens at a second illumination point focused in the sample, or the third objective lens at a third illumination point focused in the sample when sequentially illuminating the sample, and wherein fluorescence emissions emitted from the sample are simultaneously detected through the first objective lens, the second objective lens, and the third objective lens from a detection volume within a working distance of at least one of the first, second and third objective lenses.

2. The multi-photon microscopy system of claim 1, further comprising:

first, second, and third optical arrangements operatively associated with the first, second and third objective lenses, respectively, wherein the first, second, and third optical arrangements each comprise a mirror for transmitting the fluorescence emissions to a detector for detection of fluorescence emissions through each of the first, second, and third objective lenses, respectively.

3. The multi-photon microscopy system of claim 2, wherein the mirror comprises a dichroic mirror.

4. The multi-photon microscopy system of claim 1, wherein the detector comprises a point detector.

5. The multi-photon microscopy system of claim 2, further comprising:

a processor in operative communication with the detector for each of the first, second and third optical arrangements for processing image data derived from the fluorescence emissions emitted by the sample when only one of the first, second and third objective lenses illuminates the sample such that a first image is generated by the processor based on the fluorescence emissions detected through the first objective lens, a second image is generated by the processor based on the fluorescence emissions detected through the second objective lens, and a third image is generated by the processor based on the fluorescence emissions detected through the third objective lens.

6. The multi-photon microscopy system of claim 5, wherein the processor combines the first image, the second image and the third image combined and then registered relative to each other.

7. The multi-photon microscopy system of claim 1, further comprising:

one or more additional objective lenses in operative association with the laser source and the scanner for sequentially illuminating the sample and detecting the fluorescence emissions emitted by the sample.

8. The multi-photon microscopy system of claim 2, further comprising:

a processor in operative communication with the detector for obtaining image data derived from the detected fluorescence emissions and applying a deconvolution algorithm to the image data.

9. The multi-photon microscopy system of claim 1, wherein the first, second, and third longitudinal axes of the first, second and third objective lenses, respectively, are oriented at a 120 degree angle relative to each other.

10. The multi-photon microscopy system of claim 1, wherein the first, second and third longitudinal axes intersect different portions of the sample.

11. The multi-photon microscopy system of claim 1, wherein the scanner comprises a two-dimensional mirror.

12. A multi-photon microscopy system comprising:

at least three objective lenses oriented along a first longitudinal axis, a second longitudinal axis, and a third longitudinal axis, respectively, that intersect a sample at different angles; and at least one laser source for generating a laser beam and a scanner for sequentially transmitting the laser beam through each of the at least three objective lenses at a respective illumination point in the sample when illuminating the sample to generate fluorescence emissions, and wherein the fluorescence emissions emitted from the sample are simultaneously detected through the at least three objective lenses from a detection volume within a working distance of at least three objective lenses.

13. The multi-photon microscopy system of claim 12, further comprising:

at least three optical arrangements operatively associated with the at least three objective lenses, respectively, wherein the at least three optical arrangements each comprise a mirror for transmitting the fluorescence emissions to a detector for detection of fluorescence emissions through each of the at least three objective lenses, respectively.

14. A method for multi-view nonlinear imaging comprising:

positioning three or more objective lenses oriented along first, second and third longitudinal axes, respectively, that intersect a sample to be illuminated;

operatively associate at least one laser source with a respective one of the three or more objective lenses for illuminating the sample with a laser beam at a respective illumination point focused in the sample;

sequentially illuminate the sample with the laser beam through one of the at least three objective lenses in a first sequence; and simultaneously detect the fluorescence emissions generated by the illumination of the sample through each of the at least three objective lenses from a detection volume within a working distance of at least one of the three or more objective lenses.

15. The method of claim 14, further comprising:

sequentially illuminate the sample again with the laser beam through another one of the at least three objective lenses in a second sequence; and simultaneously detect the fluorescence emissions generated by the illumination of the sample through each of the at least three objective lenses.

16. The method of claim 15, further comprising:

sequentially illuminate the sample again with the laser beam through yet another one of the at least three objective lenses in a third sequence; and simultaneously detect the fluorescence emissions generated by the illumination of the sample through each of the at least three objective lenses.

17. The method of claim 15 further comprising:

operatively associate three or more optical arrangements with the three or more objective lenses, respectively, wherein the three or more optical arrangements each comprise a mirror for transmitting the fluorescence emissions to a detector for detection of fluorescence emissions through each of the three or more objective lenses.

* * * * *